Figure 1:
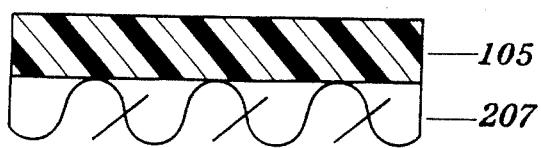

United States Patent [19]

Wong

[11] Patent Number: 4,575,471
[45] Date of Patent: Mar. 11, 1986

[54] STRUCTURE OF DUAL-FACE ARTIFICIAL LEATHER AND METHOD OF MANUFACTURE THEREOF

[76] Inventor: Winston W. Wong, 201, Tung Hwa N. Rd., Taipei, Taiwan

[21] Appl. No.: 555,707

[22] Filed: Nov. 28, 1983

[51] Int. Cl.[4] ............................................. B32B 3/26
[52] U.S. Cl. .................................. 428/137; 428/151; 428/315.9; 428/316.6; 428/309.9; 428/904
[58] Field of Search ............ 428/904, 137, 151, 315.5, 428/315.7, 315.9, 316.6, 309.9

[56] References Cited

U.S. PATENT DOCUMENTS

| | | | |
|---|---|---|---|
| 3,130,505 | 4/1964 | Markevitch | 428/316.6 |
| 3,284,274 | 11/1966 | Hulslander et al. | 428/137 |
| 4,017,656 | 4/1977 | Lasman et al. | 428/316.6 |
| 4,053,669 | 10/1977 | Kapasi et al. | 428/904 |
| 4,176,210 | 11/1979 | Skinner | 428/319.7 |
| 4,287,252 | 9/1981 | Dimiter | 428/904 |
| 4,349,597 | 9/1982 | Fine et al. | 428/316.6 |

FOREIGN PATENT DOCUMENTS

| | | | |
|---|---|---|---|
| 3011123 | 10/1981 | Fed. Rep. of Germany | 428/904 |
| 6606003 | 11/1967 | Netherlands | 428/904 |

Primary Examiner—William J. Van Balen
Attorney, Agent, or Firm—Bucknam and Archer

[57] ABSTRACT

Laminated artificial leather having a structure characterized in that, in-between a PVC foamed abraded bottom layer and a top layer of wet PU abraded or a special formulated PVC non-foamed sheet or a ground sheet of very low foaming rate, lamination of single or multi-layer foamed and non-foamed PVC are inserted as intermediates. After the addition of leather like smell flavor and punched with micro-perforation, the final product gives both surfaces a hand feeling of Nu-Buck leather with excellent stability yet the cost is low and easy to work with.

8 Claims, 4 Drawing Figures (EMBODIMENT I)

(EMBODIMENT I)

—101
—312
—323
—206

(EMBODIMENT II)

102 (103)
—102 (or 103)
—314
—325
—206

STRUCTURE OF DUAL-FACE ARTIFICIAL LEATHER AND METHOD OF MANUFACTURE THEREOF

The present invention relates to laminated artificial leather having ground faces, a hand feeling of Nu-Buck leather and more particularly to a laminated artificial leather having a PVC foamed abraded bottom layer and a top layer of wet PU abraded or a special formulated PVC non-foamed sheet or a ground sheet of very low foaming rate, lamination of single or multilayer foamed PVC being inserted there in-between as intermediates. The laminated artificial leather formed with such a novel structure gives a hand feeling just like that of a Nu-Buck leather.

Conventional artificial leather made of plastic material usually fall within categories or an ordinary PVC leather or a so-called coral sponge leather, the former is formed by adhering ordinary PVC sheet to a base cloth or by adhering foamed abraded layer to a base cloth. In view of the prices, these products are indeed attractive, yet their physical properties as well as hand feeling are not worth mentioning when they are compared with "Nu-Buck" leather which means genuine leather with special grinding treatment. Furthermore, the artificial leather of prior art are either too stiff or too soft, without the comfort and smooth feeling that the Nu-Buck has. Besides, lack of pleasant appearance as well durability cause them non-competitive.

Pin pointing the drawbacks afore mentioned, the present inventor has diligently tried to seek a way out so that those disadvantages can be eliminated and has finally found the novel structure which solves the question.

Therefore, the main object of the present invention is to provide a structure of laminated artificial leather having a PVC foamed abraded bottom layer and a top layer of wet PU abraded or a special formulated PVC non-foaming rate, lamintation of single or multilayer foamed PVC being inserted there in-between as intermediates. The final product gives good weathering property, low water absorption and free from color fading and errosion, above all, the comfortable hand feeling as well as an appearance of Nu-Buck leather.

Another object of the present invention is to provide a laminated artificial leather having feeling of Nu-Buck leather, wherein the laminations are flavored to imitate genuine leather and punctured to get micro-perforation so that it is permeable to gas but hardly water.

Still another object of the present invention is to provide a laminated artificial leather which can be made in roll with no limitation in length, to facilitate mass production. The product is suitable for use in manufacture of various articles.

A further object of the present invention is to provide a laminated artificial leather which is easy to work with while the cost is low and enjoying excellent properties as Nu-Buck leather.

Figure 2:
Figure 3:
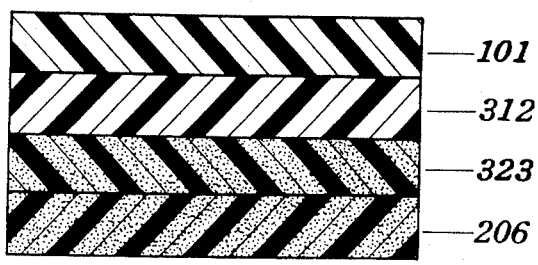
Figure 4:
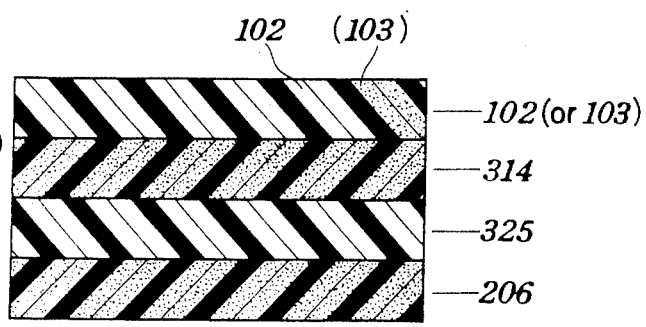

FIG. 1 illustrates an artificial leather prepared according to the prior art formed by adhering a conventional PVC sheet 105 to a base cloth 207.;

FIG. 2 also illustrates an artificial leather commonly known as "coral sponge" prepared by adhering a foamed abrasive layer 106 to a base cloth 207.;

FIG. 3 illustrates one embodiment of the artificial leather according to the present invention which comprises the top layer 101, bottom layer 206 and intermediate layers 312 and 323.;

FIG. 4 illustrates another embodiment of the artificial layer according to the present invention, which comprises bottom layer 206, top layer 102 or 103 and intermediate layers 314 and 325.;

Numeral 206 in FIGS. 3 and 4 is a bottom layer of abraded foamed PVC. Numeral 101 is a top layer of wet PV abraded material; numerals 312, 314, 325 are single or multilayer non-foamed PVC or PVC with low foaming rate, numerals 102 and 103 are a PVC non-foamed sheet or a ground sheet of a low foaming rate.

The manufacturing steps of the two related embodiments are shown respectively as follows:

(I) when wet PU material is used as top layer:

| structural numerical denotation (FIG. 3) | material | layer no. counted from top to bottom |
| --- | --- | --- |
| (top) 101 | wet PU | 1st |
| intermediate or 312 | PVC sheet, non-foamed | 2nd |
| lamination) 323 | PVC sheet, low foaming rate | 3rd |
| (bottom) 206 | foamed abrasive | 4th |

1. Draw intermediate 312 of lamination, non-foamed PVC sheet from sheet machine, served as the 2nd layer from the top;
2. Draw another intermediate 323 of lamination, low foaming rate PVC sheet from sheet machine, served as the 3rd layer from the top;
3. Draw bottom layer 206, foamed sheet from sheet machine, counted as the 4th layer;
4. Adhere above said layers 312, 323, and 206 together and cause foaming in a net foaming machine, then emboss in an embossing roller;
5. Grind the bottom surface to abrasiveness in a grinder;
6. Punch micro-perforations in a punching machine;
7. Coat the surface of (2nd) layer 312 with wet PU in a coating machine, serves as the top (1st) layer 101;
8. Condense the PU in a immersion condensation tank;
9. Wash the DMF water in a washing tank;
10. Apply vacuum suction in a suction roll;
11. Dry in a dry oven;
12. Grind the PU surface with a grinder;
13. Wax the surfaces in a treatment machine; and
14. Wind up into a roll of final product.

The wet PU used in this process of the present invention is a composition according to a special formula like follows:

| Ingredient | Parts by weight |
| --- | --- |
| PU resin | 100 |
| solvent (DMF) | 100–200 |
| surface activator | 15–20 |
| wood powder | 12–20 |
| stearic acid | 1.5 |
| pigment | 2–10 |

The foamed abrasive bottom layer is also a composition of special formula:

| Ingredient | Parts by weight |
| --- | --- |
| PVC powder | 100 |
| plasticizer | 50–90 |
| stabilizer (Ba—Zn) | 2.5–3.5 |
| foaming agent | 3–6 |

-continued

| Ingredient | Parts by weight |
| --- | --- |
| Rayon fiber | 0–40 |
| pigment | 10–15 |

(II) when PVC abrasive material is used as top layer:

| structural numerical denotation (FIG. 3) | material | layer No. counted from top to bottom |
| --- | --- | --- |
| (top) 102 (or 103) | non-foamed PVC sheet or PVC sheet of low foaming rate (<1.3) | 1st |
| (intermediate or 314 lamination) 325 | foamed PVC sheet ordinary PVC sheet | 2nd 3rd |
| (bottom) 206 | foamed abrasive | 4th |

1. From sheet machine, draw non-foamed PVC sheet or PVC sheet of low foaming rate (<1.3) as the 1st or top layer 102;
2. Draw foamed PVC sheet from sheet machine as the first intermediate 314 of lamination, or the 2nd layer counted from the top;
3. Draw ordinary PVC sheet from sheet machine as the 2nd intermediate 325 of lamination, or the 3rd layer counted from the top;
4. Draw foamed abrasive sheet from sheet machine as bottom layer 206 or the 4th layer from the top;
5. Adhere the four layers together and cause foaming in a net foaming machine, then emboss in an embossing roller;
6. Grind the bottom surface in a grinder;
7. Grind the top surface in a grinder;
8 Wax the surfaces in a printing treatment machine; and
9. Wind up into roll of final product.

The foamed abrasive bottom layer used in this embodiment is preferably of the same composition as the last embodiment, while the PVC sheet for the top layer is of a special formula like follows:

| Ingredient | Parts by weight |
| --- | --- |
| PVC suspension powder | 70 |
| PVC emulsion powder | 30 |
| plasticizer | 80–140 |
| stabilizer | 2.5–3.5 |
| foaming agent | 0–2.5 |
| PU rubber | 5–30 |
| pigment | 5–15 |

The following examples are described for further illustration of the process involved:

EXAMPLE 1:

Wet PU is used as top layer

First from a sheet machine, under 180° C., draw non-foamed DOP 40PHR PVC sheet of 0.25 m/m thickness with suitable softness and good physical property, served as the first intermediate 312 of the lamination (or the 2nd layer counted from top); from another sheet machine under 160° C., draw 0.3 m/m thick foamed PVC sheet with a foam rate of 1.8, served as the second intermediate 323 of the lamination 30 (or the 3rd layer from the top); from a further sheet machine, under 165° C., draw DOP 85PHR Rayon fiber 10 PHR PVC foamed abrasive sheet as bottom layer 206 (or the 4th layer counted from the top). Adhere the said three layers 312, 332, 206 and cause to foam under 230° C., emboss, in a net foaming machine, then pressed in a calender to smooth out the surfaces. The semi-finished product is then moved to a grinder, grind the bottom foamed surface with 40 mesh sand paper; punched micro-perforations in a puncher. Coat PU paste in a wet PU coating machine to an extent of 1000 gm/yd$^2$, then immerse the piece in a 14 m long condesation tank for PU resin to condense in water of 30° C. Wash the product in a 60 m long washing tank with 40°–60° C. water, dry with a vacuum suction roll then in a 20 m drying oven of 130°–150° C. Grind PU surface with a grinder, tract the surface in a treatment machine to better the hand feeling. The finished product is cut to 20 yard length after inspection, wind up in roll and pack.

EXAMPLE 2

PVC abrasive material is used as top layer

From sheet machine under 175° C. draw PVC non-foamed sheet of special formula and having a thickness of 0.45 m/m as the (1st or) top layer 102; draw under 160° C. from another sheet machine, 0.36 m/m foamed sheet with 1.8 times foaming rate, as the first intermediate 314 of the lamination (or 2nd layer counted from the top); from still another sheet machine under 175° C. draw 0.25 m/m thick DOP 50PHR non-foamed sheet of somewhat harder and excellent physical property as the second intermediate 325 of the lamination 314 (or 3rd layer counted from the top); finally from a further sheet machine draw DOP 85PHR Rayon pile 10PHR PVC foamed material as bottom (or 4th) layer 206. Move the four layers to a net foaming machine for adhering and foaming under 230° C. Grind the bottom surface with 40 mesh sand paper, then the top surface with 240 mesh sand paper. Treat the surfaces in a treatment machine to get a hand feeling even more close to that of the Nu-Buck leather. The finished product is inspected, cut to 20 yard length, wind up in roll and pack.

What I claim is:

1. A laminated artificial leather consisting of a PVC foamed abraded bottom layer, a top layer of (a) wet PU abraded material (b) a PVC non-foamed sheet or (c) a ground sheet of very low foaming rate, and laminations of a single or a multilayer foamed and non-foamed intermediate layers of PVC are inserted as intermediates between said bottom layer and said top layer, said artificial leather having microperforations.

2. A laminated artificial leather consisting of a PVC foamed abraded bottom layer, a top layer of (a) wet PU abraded material (b) a PVC non-foamed sheet or (c) a ground sheet of very low foaming rate, and laminations of a single or a multi-layer and non-foamed intermediate layers of PVC are inserted as intermediates between said bottom layer and said top layer and wherein the intermediate layers additionally comprise a layer of fabric or a flocked layer.

3. A laminated artificial leather consisting of a PVC foamed abraded bottom layer, a top layer of (a) wet PU abrasive, (b) a PVC non-foamed sheet or (c) a ground sheet of very low foaming rate, and laminations of a single or a multi-layer and non-foamed intermediate layers of PVC are inserted as intermediates between said bottom layer and said top layer and wherein said bottom layer additionally comprises rayon pile.

4. The artificial leather according to claim 1 wherein said top layer is a composition consisting of:
   100 parts of PU resin;

100–200 parts of dimethyl formamide solvent;
15–20 parts of surface activator;
12–20 parts of wood powder;
1.5 parts of stearic acid;
2–10 parts of pigment;
all parts being by weight.

5. The artificial leather according to claim 3 wherein the foamed abraded bottom layer is a composition consisting of:
   100 parts of PVC powder;
   50–90 parts of plasticizer;
   2.5–3.5 parts of Ba-Zn stabilizer;
   3–6 parts of foaming agent;
   up to 40 parts of Rayon fibers;
   10–15 parts of pigment;
   all parts being by weight.

6. The process for the preparation of the artificial leather according to claim 3, wherein the top layer is a wet PU, abraded layer, which consists of:
   (1) drawing a non-foamed PVC sheet as a first intermediate layer,
   (2) drawing a low foaming rate PVC sheet, as the second intermediate layer;
   (3) drawing a foamed rayon fiber-PVC abrasive sheet as the bottom layer;
   (4) adhering said layers from steps (1), (2), and (3) to each other to form a laminate;
   (5) foaming said laminate at 230° C.;
   (6) embossing said foamed laminate from step (5);
   (7) grinding the bottom layer;
   (8) punching to cause microperforations;
   (9) coating the surface of the first intermediate layer with wet PU to form the top layer and,
   (10) grinding the top layer.

7. The process of preparation of the artificial leather according to claim 3, wherein the top layer is PVC abraded layer which consists of the steps of:
   (1) drawing a non-foamed PVC or PVC sheet of low foaming rate as the top layer;
   (2) drawing a foamed PVC sheet as the first intermediate layer;
   (3) drawing a non-foamed PVC sheet as the second intermediate layer;
   (4) drawing a foamed PVC sheet containing rayon pile as the bottom layer;
   (5) adhering the layer from steps (1), (2), (3) and (4) to each other to form a laminate;
   (6) foaming said laminate at 230° C.;
   (7) grinding the bottom layer and then
   (8) grinding the top layer.

8. The process according to claim 7 wherein said top layer is a composition consisting of:
   PVC suspension powder: 70
   PVC emulsion powder: 30
   plasticizer: 80–140
   stabilizer: 2.5–3.5
   foaming agent: 0–2.5
   PU rubber: 5–30
   pigment: 5–15

* * * * *